April 25, 1961 M. H. DILKE 2,980,964
LINEAR POLYETHYLENE FILMS OF IMPROVED TRANSPARENCY
AND METHOD OF MAKING SAME
Filed Jan. 2, 1957
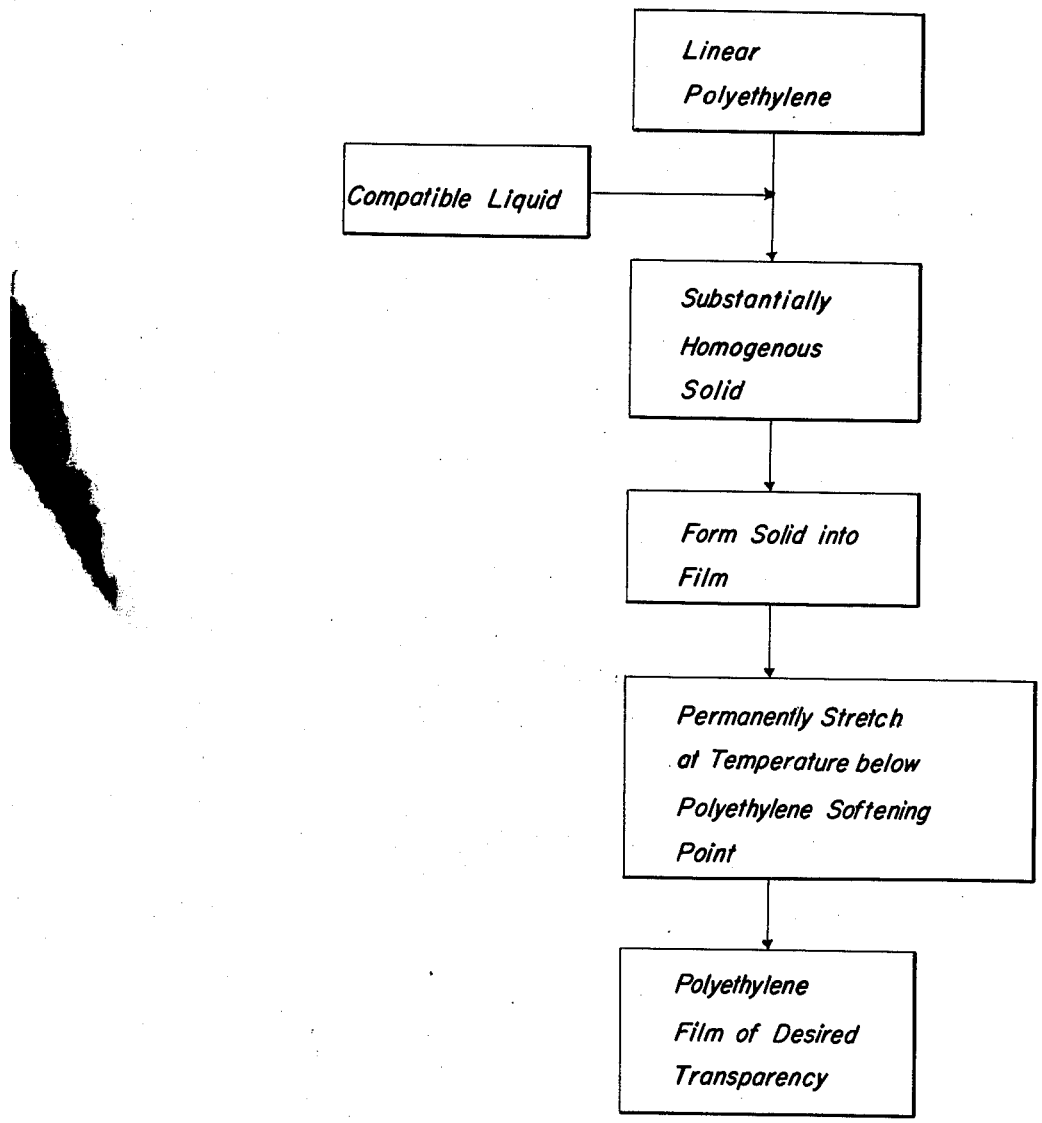
INVENTOR
Max Henry Dilke
BY *Wenderoth, Lind & Ponack*
ATTORNEYS

2,980,964
LINEAR POLYETHYLENE FILMS OF IMPROVED TRANSPARENCY AND METHOD OF MAKING SAME

Max Henry Dilke, Coulsdon, England, assignor to The Distillers Company Limited, Edinburgh, Scotland, a British company Filed Jan. 2, 1957, Ser. No. 632,003
Claims priority, application Great Britain Jan. 14, 1956
6 Claims. (Cl. 18—57)

The present invention relates to the production of thin sheets or films of linear polyethylene. It particularly relates to such films having improved transparency and clarity.

The term "linear polyethylene" is employed throughout this specification in its usual sense to denote solid, high molecular weight polymers obtained by the homopolymerisation of ethylene under such conditions that the molecular structure of the polymer consists essentially of straight carbon chains, i.e. there are relatively few branch chains in the polyethylene molecules. Linear polyethylenes are distinguished from non-linear polyethylenes by greater density and the linear polyethylenes to be used in the present invention have densities of at least 0.95. The preparation of such linear polyethylenes has been described, for instance in Belgian Patents 530,617, 533,362, 534,792 and 534,888.

According to the present invention, the process for the production of a linear polyethylene film of good transparency comprises mixing linear polyethylene having a density of at least 0.95 with a compatible liquid to form a solid, substantially homogeneous composition, forming the homogeneous composition into a film and permanently stretching the film at a temperature below the softening point of the polyethylene to give the desired transparency.

The accompanying drawing is a flow sheet representing the above-outlined process.

Any inert liquid which is compatible with the linear polyethylene can be used to form the solid homogeneous compositions. The measure of compatibility is the power to form a completely homogeneous composition, i.e. a composition in which it is impossible to detect with the naked eye any unmixed liquid particles. So long as a homogeneous composition can initially be formed, the liquid chosen is satisfactory and the fact that the liquid may subsequently exude from the finished film does not affect the efficiency of the process of the present invention to form films of good transparency. The liquid is preferably clear or transparent and not a solvent for the polyethylene, but if a solvent is used it should not be employed in such quantities that the resultant polyethylene compatible liquid mixture is not solid at the temperatures to be employed for forming and stretching the film.

A wide range of liquids are inert with respect to and compatible with linear polyethylene. Their boiling points must be sufficiently high to allow them to be worked with the polyethylene at a temperature above the softening point of the latter. Liquids which have been used as plasticisers for other polymers are suitable and, for example, the liquid plasticisers and extenders described in the book "Plasticizers" by D. N. Buttrey, published by the Cleaver-Hume Press Ltd. can be used. Specific examples of suitable liquids are ethers such as for example $\alpha,\alpha'$-diphenyl diethyl ether, $\beta,\beta'$-diphenyl diethyl ether and $\alpha$-methyl dibenzyl ether; hydrocarbons such as for example hydrogenated terphenyls, $\alpha$-methylstyrene dimer, styrene dimer, dodecyl benzene and alkyl substituted naphthalenes; chlorinated hydrocarbons such as for example chlorinated diphenyls and chlorinated paraffins; polyethylene glycols and esters such as for example tricresyl phosphate, the alkyl phthalates, the alkyl adipates and sebacates, glycerol and glycol esters, e.g. the acetates, the butyrates and the benzoates and citric acid esters e.g. the triethyl, the tributyl and the triaryl citrates.

The preferred compatible liquids are the mono- and di-isopropyl naphthalenes and mixtures thereof which are good plasticisers for linear polyethylene.

The quantity of compatible liquid employed can be varied widely and still give films of good transparency depending on the liquid employed. Obviously it is unnecessary to employ more liquid than the minimum necessary to produce suitable films. This minimum amount will vary with the degree of transparency required and the particular liquid employed. In general films of good transparency can be obtained from compositions containing from 5 to 50% by weight of compatible liquid.

The linear polyethylene is mixed with the compatible liquid to form the solid, substantially homogeneous composition by any convenient technique. In order to get good mixing of the liquid with the polyethylene it is necessary to heat the latter to a temperature above its softening point. Most suitably the mixing is carried out on heated rolls.

The solid, homogeneous composition is formed into a film by any of the techniques well known in connection with the production of film from a solid polyethylene. Most of these techniques have been worked out for non-linear polyethylene, i.e. branched chain polyethylene, but they can be readily adapted for use with the solid, homogeneous composition formed in the process of the present invention.

The initially formed film, if it has not been subjected to considerable stretching action during its formation, does not possess a high degree of transparency. Consequently, the final step in the process of the present invention comprises permanently stretching the film in its own plane whereby its transparency is considerably improved. The film may be stretched in any direction within its own plane and if desired it may be stretched in two or more directions either simultaneously or consecutively. The stretching process is carried out at a temperature below the softening point of the polyethylene. Most suitably the stretching is carried out at a temperature in the range 0° to 50° C., for example room temperature.

The rate at which the initially formed film is stretched to improve the transparency thereof is not critical and films of improved transparency can be obtained under widely differing conditions. For instance rates as low as 10% per minute or as high as 1000% per minute can be successfully employed.

It should be noted that as the film is permanently stretched, its surface area increases and consequently its thickness decreases. The improvement of transparency of the stretched film is greater than would be expected from the simple thinning of the film due to the stretching and it is believed that during the stretching, re-orientation of the linear polyethylene molecules takes place under the influence of the compatible liquid and that it is this re-orientation which causes the improved transparency. In the absence of any compatible liquid, linear polyethylene films may be stretched to give thinner films of improved tensile strength, but, during the stretching, the film becomes less transparent than the starting material and, in many cases, becomes completely opaque.

The following examples illustrate the process of the present invention, the parts referred to being by weight. The polyethylenes used are identified by their densities and/or their "Melt Indexes." The "Melt Index" of a polymer is defined as the weight in grams extruded in 10 minutes at 190° C. from a standard extrusion apparatus as described in British Standard 1972:1953.

*Example 1*

A homogeneous composition was prepared by milling 15 parts of a linear polyethylene of Melt Index 0.7 (density 0.96) with 5 parts of an isomeric mixture of diisopropyl naphthalenes at 150° C. When this composition was compression moulded into a sheet it was opaque. However when sections of this sheet were drawn at room temperature at a rate of 300% per minute a clear film was formed which remained clear on standing several months and which did not exude plasticiser. The initially moulded sheet was approximately .030 inch thick and was drawn down to approximately 0.010 inch after being stretched several hundred percent.

*Example 2*

A similar composition to that described in Example 1 was prepared using a mixture of α- and β-isopropyl naphthalenes as the compatible liquid and again an opaque sheet was formed which gave a transparent film on stretching at room temperature at a rate of 300% per minute. There was no sign of exudation of the isopropyl naphthalene on standing.

*Example 3*

Homogeneous compositions were prepared using 15 parts of the same linear polyethylene as described in Example 1, and 5 parts of dioctyl phthalate and also 17 parts of the linear polyethylene with 3 parts of dioctyl phthalate. In both cases compression moulding gave opaque sheets which on drawing at room temperature gave transparent films. In these cases there was a tendency for the liquids to exude although the film remained transparent.

A series of transparent films are prepared by the process described in Example 1 using samples of linear polyethylene having Melt Indices varying from 0.2–20. In all cases films of excellent transparency are obtained.

Films similar to those prepared in Example 3 are produced by repeating the process of the example but replacing the dioctyl phthalate with other compatible liquids such as for instance α,α-diphenyl diethyl ether, α-methylstyrene dimer, tricresyl phosphate, nonyl adipate, glycerol butyrate and tri-ethyl citrate. In all cases films of good transparency are produced.

I claim:
1. A process for the production of a linear polyethylene film of good transparency which comprises mixing linear polyethylene, having a density of at least 0.95, with a compatible inert transparent liquid to form a solid, substantially homogeneous composition, forming the homogeneous composition into a film and permanently stretching the film at a temperature below the softening point of the polyethylene to give the desired transparency.

2. A process as claimed in claim 1 wherein the solid, substantially homogeneous composition contains from 5 to 50% by weight of the compatible liquid.

3. A process for the production of a linear polyethylene film of good transparency which comprises mixing linear polyethylene, having a density of at least 0.95, with a compatible liquid selected from the group consisting of α- and β-isopropylnaphthalenes and mixtures thereof to form a solid, substantially homogeneous composition, forming the homogeneous composition into a film and permanently stretching the film at a temperature below the softening point of the polyethylene to give the desired transparency.

4. A process for the production of a linear polyethylene film of good transparency which comprises mixing linear polyethylene, having a density of at least 0.95, with a compatible liquid selected from the group consisting of the di-isopropylnaphthalenes and mixtures thereof to form a solid, substantially homogeneous composition, forming the homogeneous composition into a film and permanently stretching the film at a temperature below the softening point of the polyethylene to give the desired transparency.

5. A process for the production of a linear polyethylene film of good transparency which comprises mixing linear polyethylene, having a density of at least 0.95, with a compatible inert clear liquid to form a solid, substantially homogeneous composition, forming the homogeneous composition into a film and permanently stretching the film at a temperature below the softening point of the polyethylene to give the desired transparency, the boiling point of the compatible clear liquid being higher than the temperature at which the film is permanently stretched.

6. A transparent film consisting of a permanently stretched substantially homogeneous solid composition, said composition consisting essentially of linear polyethylene having a density of at least 0.95 and an inert liquid which is compatible with said polyethylene.

References Cited in the file of this patent

UNITED STATES PATENTS

| | | |
|---|---|---|
| 2,232,475 | Renfrew et al. | Feb. 18, 1941 |
| 2,244,208 | Miles | June 3, 1941 |
| 2,547,763 | Land et al. | Apr. 3, 1951 |
| 2,743,482 | Ferner | May 1, 1956 |
| 2,762,791 | Pease et al. | Sept. 11, 1956 |
| 2,763,029 | Tulloss | Sept. 18, 1956 |

FOREIGN PATENTS

| | | |
|---|---|---|
| 510,145 | Canada | Feb. 15, 1955 |
| 765,904 | Great Britain | Jan. 16, 1957 |